United States Patent
Chacko et al.

(10) Patent No.: US 11,397,898 B2
(45) Date of Patent: Jul. 26, 2022

(54) SYSTEM FOR ALLOWING A SECURE ACCESS TO A MICROSERVICE

(71) Applicant: HCL TECHNOLOGIES LIMITED, Uttar Pradesh (IN)

(72) Inventors: Simy Chacko, Chennai (IN); Venkatesh Shankar, Chennai (IN)

(73) Assignee: HCL TECHNOLOGIES LIMITED, Noida (IN)

( * ) Notice: Subject to any disclaimer, the term of this patent is extended or adjusted under 35 U.S.C. 154(b) by 398 days.

(21) Appl. No.: 16/791,452

(22) Filed: Feb. 14, 2020

(65) Prior Publication Data

US 2020/0272912 A1 Aug. 27, 2020

(30) Foreign Application Priority Data

Feb. 27, 2019 (IN) .............................. 201911007700

(51) Int. Cl.
| | |
|---|---|
| *G06F 21/00* | (2013.01) |
| *G06N 5/02* | (2006.01) |
| *G06N 20/00* | (2019.01) |
| *G06K 9/62* | (2022.01) |
| *G06F 9/54* | (2006.01) |

(52) U.S. Cl.
CPC .............. *G06N 5/025* (2013.01); *G06F 9/547* (2013.01); *G06K 9/6282* (2013.01); *G06N 20/00* (2019.01)

(58) Field of Classification Search
CPC ........ G06N 5/025; G06N 20/00; G06F 9/547; G06K 9/6282
See application file for complete search history.

(56) References Cited

U.S. PATENT DOCUMENTS

| | | | | |
|---|---|---|---|---|
| 7,376,650 B1 * | 5/2008 | Ruhlen | ................. | H04L 61/305 707/E17.112 |
| 7,734,651 B1 * | 6/2010 | Haeri | .................... | G06F 16/955 707/792 |
| 9,258,369 B2 * | 2/2016 | Kamp | .................... | H04L 67/34 |
| 9,609,009 B2 | 3/2017 | Muddu et al. | | |
| 2010/0217772 A1 * | 8/2010 | Uppala | ................. | G06Q 10/06 707/769 |

(Continued)

OTHER PUBLICATIONS

Stateless authentication for Microservices—Marcus Cavalcanti—Nov. 8, 2018.

*Primary Examiner* — Ghodrat Jamshidi
(74) *Attorney, Agent, or Firm* — Kendal Sheets

(57) ABSTRACT

Disclosed is a system for allowing secure access to a microservice. An Application Programming Interface (API) gateway receives a request comprising a Uniform Resource Locator (URL) associated to the microservice. A set of input parameters indicating information about the user device and the microservice is identified from the URL. The system performs validation of input parameters, extraction of request patterns, tracking of IP address, and detection of user credentials to provide output parameters. A decision tree comprising rules is generated by using a supervised machine learning technique on the output parameters. Further, the API gateway creates a stateless identity token to encrypt the request. The stateless identity token is created based on the user credentials and at least one rule applicable to the request. Once the stateless identity token is created, the stateless identity token is verified to allow the secure access to the microservice.

10 Claims, 4 Drawing Sheets

(56) References Cited

U.S. PATENT DOCUMENTS

| | | | |
|---|---|---|---|
| 2010/0299347 A1* | 11/2010 | Greenberg | G06F 16/972 |
| | | | 707/769 |
| 2011/0219035 A1 | 9/2011 | Korsunsky et al. | |
| 2014/0156761 A1* | 6/2014 | Heffernan | H04L 67/02 |
| | | | 709/206 |
| 2017/0177650 A1* | 6/2017 | Devine | G06F 16/2455 |
| 2017/0272485 A1* | 9/2017 | Gordon | H04N 21/8456 |
| 2018/0027006 A1 | 1/2018 | Zimmermann et al. | |
| 2019/0230189 A1* | 7/2019 | Keller | H04L 67/2842 |
| 2022/0027428 A1* | 1/2022 | Sutton | G06F 21/563 |

* cited by examiner

SYSTEM FOR ALLOWING A SECURE ACCESS TO A MICROSERVICE

CROSS-REFERENCE TO RELATED APPLICATIONS AND PRIORITY

The present application claims benefit from Indian Complete Patent Application No. 201911007700 filed on 27 Feb. 2020 the entirety of which is hereby incorporated by reference.

TECHNICAL FIELD

The present subject matter described herein, in general, relates to secure access to a microservice and more particularly to allowing secure access to a microservice at an Application Programming Interface (API) gateway.

BACKGROUND

In web application security domain, it has been observed that limiting access rights for each user to the bare minimum permissions related to the work is a fundamental process. Typically, the access rights are restricted based on a set of conventional rules created based on multiple input parameters. Example of the input parameters include, but not limited to, user name, user's role and/or permissions, location of the permission, age of the token, sequence of operations, and the location, frequency of operation, minimum gap between operations, maximum number of operations in a session, access location pattern, location change pattern, and validation of input parameters. It is to be noted that in most use cases the rules are combination of one or more aforementioned input parameters. However, creating the rules manually is an impossible task as there's always a probability of missing out at least one input parameter. In addition, manual creation of rules is not only cumbersome but also employs configuration overhead.

SUMMARY

Before the present systems and methods for allowing a secure access to a microservice, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods allowing a secure access to a microservice and the concepts are further described below in the detailed description. This summary is not intended to identify essential features of the claimed subject matter nor is it intended for use in determining or limiting the scope of the claimed subject matter.

In one implementation, a method for allowing a secure access to a microservice is disclosed. In order to allow the secure access to a microservice, initially, a request may be received from a user device at an Application Programming Interface (API) gateway. The request may comprise a Uniform Resource Locator (URL) associated to the microservice. Further, a set of input parameters may be identified from the URL. The set of input parameters may indicate information about the user device and the microservice. Subsequently, the set of input parameters may be validated to provide a list of valid input parameters by comparing data type of each input parameter with a predefined list of valid data type for each input parameter. Furthermore, a request pattern may be extracted from the URL to identify an operation to be performed at the microservice. It is to be noted that the request pattern may be extracted by using machine learning techniques on historical data associated to the request pattern. After extracting the request pattern, an Internet Protocol (IP) address associated to the URL may be tracked in order to form a group of one or more IP addresses corresponding to the microservice. The IP address may be a subset of input parameters. In the next step, user credentials may be detected from the request to allow an access to the microservice when requested by the user device. Subsequently, a decision tree may be generated by using a supervised machine learning technique on the list of valid input parameters, the request pattern, the group of one or more IP address, and the user credentials. The decision tree may comprise rules to allow the access to the microservice. Upon generating the decision tree, a stateless identity token may be created at the API to encrypt the request. The stateless identity token may be created based on the user credentials and at least one rule applicable to the request. Once the stateless identity token is created, the stateless identity token may be verified to allow a secure access to the microservice. In one aspect, the aforementioned method for allowing a secure access to a microservice may be performed by a processor using programmed instructions stored in a memory.

In another implementation, a system for allowing a secure access to a microservice is disclosed. The system may comprise a processor and a memory coupled to the processor. The processor may execute a set of instructions stored in the memory. Initially, the system may receive a request from a user device at an Application Programming Interface (API) gateway. The request may comprise a Uniform Resource Locator (URL) associated to a microservice. Further, the system may identify a set of input parameters from the URL. The set of input parameters may indicate information about the user device and the microservice. Subsequently, the system may validate the set of input parameters to provide a list of valid input parameters by comparing data type of each input parameter with a predefined list of valid data type for each input parameter. Furthermore, the system may extract a request pattern from the URL to identify an operation to be performed at the microservice. It is to be noted that the request pattern may be extracted by using machine learning techniques on historical data associated to the request pattern. After extracting the request pattern, the system may track an Internet Protocol (IP) address associated to the URL in order to form a group of one or more IP addresses corresponding to the microservice. The IP address may be a subset of input parameters. In the next step, the system may detect user credentials from the request to allow an access to the microservice when requested by the user device. Subsequently, the system may generate a decision tree by using a supervised machine learning technique on the list of valid input parameters, the request pattern, the group of one or more IP address, and the user credentials. The decision tree may comprise rules to allow the access to the microservice. Upon generating the decision tree, the system may create a stateless identity token at the API to encrypt the request. The stateless identity token may be created based on the user credentials and at least one rule applicable to the request. Once the stateless identity token is created, the system may verify the stateless identity token to allow a secure access to the microservice.

In yet another implementation, non-transitory computer readable medium embodying a program executable in a computing device for allowing a secure access to a microservice is disclosed. The program may comprise a program code for receiving a request from a user device at an Application Programming Interface (API) gateway. The request may comprise a Uniform Resource Locator (URL) associated to a microservice. Further, the program may comprise a program code for identifying a set of input parameters from the URL. The set of input parameters may indicate information about the user device and the microservice. The program may comprise a program code for validating the set of input parameters to provide a list of valid input parameters by comparing data type of each input parameter with a predefined list of valid data type for each input parameter. The program may comprise a program code for extracting a request pattern from the URL to identify an operation to be performed at the microservice. It is to be noted that the request pattern may be extracted by using machine learning techniques on historical data associated to the request pattern. The program may comprise a program code for tracking an Internet Protocol (IP) address associated to the URL in order to form a group of one or more IP addresses corresponding to the microservice. The IP address may be a subset of input parameters. The program may comprise a program code for detecting user credentials from the request to allow an access to the microservice when requested by the user device. The program may comprise a program code for generating a decision tree by using a supervised machine learning technique on the list of valid input parameters, the request pattern, the group of one or more IP address, and the user credentials. The decision tree may comprise rules to allow the access to the microservice. The program may comprise a program code for creating a stateless identity token at the API to encrypt the request. The stateless identity token may be created based on the user credentials and at least one rule applicable to the request. The program may comprise a program code for verifying the stateless identity token to allow a secure access to the microservice.

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document; however, the disclosure is not limited to the specific methods and apparatus for allowing a secure access to a microservice as disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
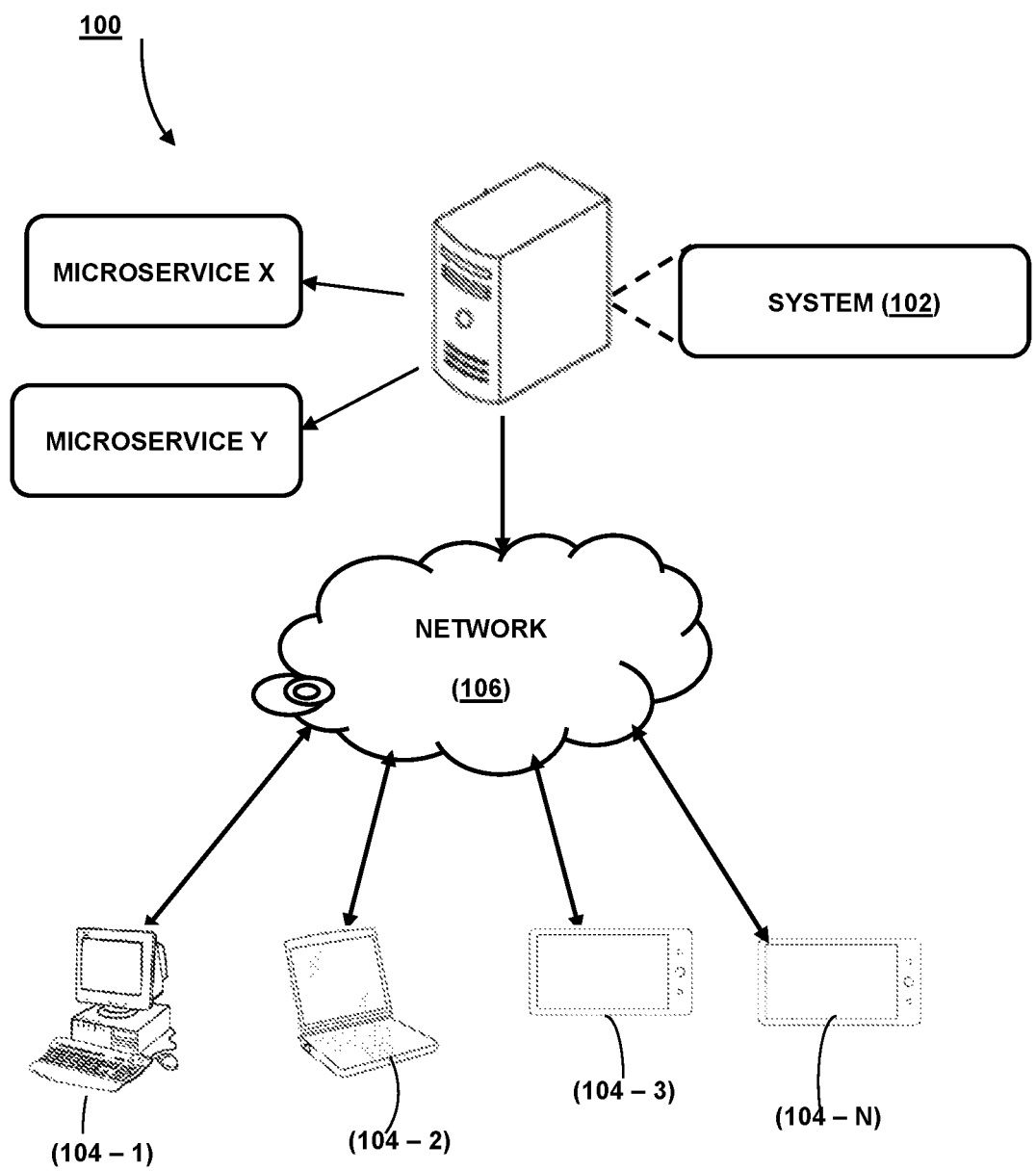
FIG. 1 illustrates a network implementation of a system for allowing a secure access to a microservice, in accordance with an embodiment of the present subject matter.

Some embodiments of this disclosure, illustrating all its features, will now be discussed in detail. The words "receiving," "identifying," "validating," "extracting," "detecting," "tracking," "generating", "creating", and "verifying" and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods for allowing a secure access to a microservice are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The present invention indicates a system for allowing a secure access to a microservice. It is to be noted that the microservice is a service oriented architecture architectural style to structure an application as a collection of services. The microservice is scalable in nature. The secure access is allowed based on a plurality of rules associated to each request made by a user. The request may be made by using a user device. Example of the user device includes a laptop, a mobile phone, a web browser, a computer, a palmtop and others. In order to allow the secure access, the request may be analyzed at an Application Programming Interface (API) gateway of a network. The API gateway acts as a single point of entry for a defined group of microservices. In other words, the API gateway is a program running in the network to authenticate each request before allowing the secure access to the microservice. In one embodiment, the API gateway may be linked to a plurality of microservices.

The API gateway, upon receipt of the request, identifies a set of input parameters associated to a Uniform Resource Locator (URL) corresponding to the microservice. The set of input parameters may include a user name, user roles and permission, a location of the user device, an age of the request, a frequency of requests, a time gap between two requests, a count of requests made by the user device in a session, an access location pattern, and a location change pattern. Further to identifying the set of input parameters, the proposed system may validate the set of input parameters to provide a list of valid input parameters. Furthermore, the system utilizes a supervised machine learning on the list of valid input parameters to generate a decision tree. The decision tree comprises rules to allow the secure access to the microservice. In one embodiment, the decision tree may comprise a list of predefined rules applicable to the request. The predefined rules may be stored at a system database.

Subsequently, a stateless identity token is created at the API gateway to authenticate the request. In one embodiment, the stateless identify token may be acts as a cookie in the web browser. After verifying the stateless identity token, the request may be allowed the secure access to the microservice. While aspects of described system and method for allowing a secure access to a microservice and may be implemented in any number of different computing systems, environments, and/or configurations, the embodiments are described in the context of the following exemplary system.

Referring now to FIG. 1, a network implementation 100 of a system 102 for allowing a secure access to a microservice is disclosed. In order to allow the secure access to the microservice, initially, the system 102 may receive a request from a user device at an Application Programming Interface (API) gateway. The request may comprise a Uniform Resource Locator (URL) associated to a microservice. Further, the system 102 may identify a set of input parameters from the URL. The set of input parameters may indicate information about the user device and the microservice. Subsequently, the system 102 may validate the set of input parameters to provide a list of valid input parameters by comparing data type of each input parameter with a predefined list of valid data type for each input parameter. Furthermore, the system 102 may extract a request pattern from the URL to identify an operation to be performed at the microservice. It is to be noted that the request pattern may be extracted by using machine learning techniques on historical data associated to the request pattern. After extracting the request pattern, the system 102 may track an Internet Protocol (IP) address associated to the URL in order to form a group of one or more IP addresses corresponding to the microservice. The IP address may be a subset of input parameters. In the next step, the system 102 may detect user credentials from the request to allow an access to the microservice when requested by the user device. Subsequently, the system 102 may generate a decision tree by using a supervised machine learning technique on the list of valid input parameters, the request pattern, the group of one or more IP address, and the user credentials. The decision tree may comprise rules to allow the access to the microservice. Upon generating the decision tree, the system 102 may create a stateless identity token at the API to encrypt the request. The stateless identity token may be created based on the user credentials and at least one rule applicable to the request. Once the stateless identity token is created, the system 102 may verify the stateless identity token to allow a secure access to the microservice.

Although the present disclosure is explained considering that the system 102 for allowing a secure access to a microservice is implemented on a server, it may be understood that the system 102 may be implemented in a variety of computing systems, such as a laptop computer, a desktop computer, a notebook, a workstation, a mainframe computer, a server, a network server, a cloud-based computing environment. It will be understood that the system 102 may be used by multiple users through one or more user devices 104-1, 104-2 . . . 104-N, collectively referred to as user 104 or stakeholders, hereinafter, or applications residing on the user devices 104 to securely access the microservice X, microservice Y, collectively referend to as microservice. In one implementation, the system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

Figure 2:
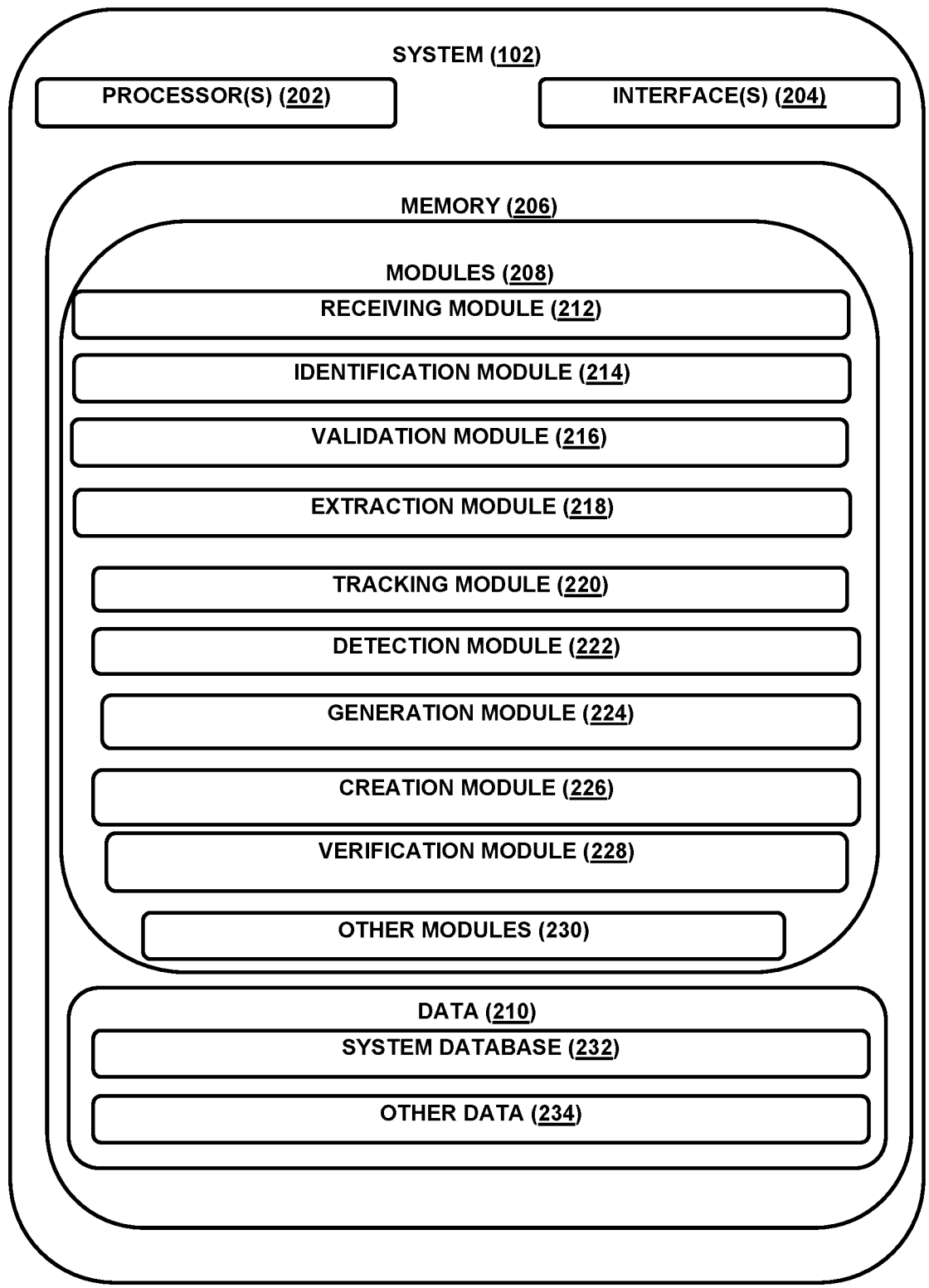
FIG. 2 illustrates the system, in accordance with an embodiment of the present subject matter.

Referring now to FIG. 2, the system 102 for allowing a secure access to a microservice is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 for allowing a secure access to a microservice to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a receiving module 212, an identification module 214, a validation module 216, an extraction module 218, a tracking module 220, a detection module 222, a generation module 224, a creation module 226, a verification module 228, and other modules 230. The other modules 230 may include programs or coded instructions that supplement applications and functions of the system 102 for allowing a secure access to a microservice. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a system database 232 and other data 234. The other data 234 may include data generated as a result of the execution of one or more modules in the other modules 230.

As there are various challenges observed in the existing art, the challenges necessitate the need to build the system 102 for allowing a secure access to a microservice. In order to allow the secure access to the microservice, at first, a user may use the client device 104 to access the system 102 via the I/O interface 204. The user may register them using the I/O interface 204 in order to use the system 102. In one aspect, the user may access the I/O interface 204 of the system 102. The system 102 may employ the receiving module 212, the identification module 214, the validation module 216, the extraction module 218, the tracking module 220, the detection module 222, the generation module 224, the creation module 226, and the verification module 228. The detail functioning of the modules is described below with the help of figures.

The present system 102 allows a secure access to a microservice in a network environment. It is to be noted that the microservice is a service oriented architecture architectural style to structure an application as a collection of services. The microservice is lightweight and scalable in nature. The microservice is program accessing features of an application residing at a server. In order to allow the secure access, initially, the receiving module 212 receives a request from a user device at an Application Programming Interface (API) gateway. In one aspect, the request may comprise a Uniform Resource Locator (URL) associated to a microservice Example of the user device are mobile, laptop, a computer, a palmtop, and alike.

The API gateway acts as a single point of entry for a defined group of microservices. In other words, the API gateway is a program running in the network to authenticate each request before allowing the secure access to the microservice. In one embodiment, the API gateway may be linked to a plurality of microservices. It must be noted that the API gateway is in addition to a firewall present in the network. The firewall is configured to monitor and control incoming and outgoing network traffic based on a predetermined security rules. On the other hand, the API gateway is configured to authenticate each request based on user credentials associated to the user device. It must be noted that the request may be stored at the system database 232.

Further to receiving the request, the identification module 214 identifies a set of input parameters from the URL. The set of input parameters may indicate information about the user device and the microservice. Typically, the set of input parameters are a user name, user roles and permission, a location of the user device, an age of the request, a frequency of requests, a time gap between two requests, a count of requests made by the user device in a session, an access location pattern, and a location change pattern. It is to be noted that the identification module 214 may identify the set of input parameters in real time upon receipt of the request. The set of input parameters may be stored at the system database 232.

Further to identifying the set of input parameters, the validation module 216 may validate the set of input parameters to provide a list of valid input parameters by comparing data type of each input parameter with a predefined list of valid data type for each input parameter. Example of data type includes stings, alphanumeric, number, character, array, HTML chars, ascii values, non-ascii values, and alike. The predefined list of valid data type may be stored at the system database 232. The predefined list of valid data type is based on a data type of an input parameter and validation rules associated to each data type. Example of the validation rules for string type of input parameters include, but not limited to, Is alphabet? Is alphanumeric ?, Length—(for identifying max and minimum length), Is valid HTML chars ?, Is Base64 ?, Is Base16 ? Is non-ascii? Is valid URL chars ?, Is optional ?. Example of the validation rules for number type of input parameters include, but not limited to, is decimal allowed? Is optional ?, and Value to find minimum and maximum value.

Furthermore, the extraction module 218 may extract a request pattern from the URL to identify an operation to be performed at the microservice. The request pattern may be extracted by using machine learning techniques on historical data associated to the request pattern. Example of the machine learning techniques include Natural Language Processing (NLP) techniques, nearest neighbor algorithm, K-means, clustering and others. It is to be noted that the historical data may be preprocessed before feeding into the system. In one implementation, the operation is based on an application program provide by the microservice. Typically, for a Hyper Text Transfer Protocol (HTTP) application, example of the operation includes, but not limited to, POST, GET, PUSH, PUT, GET, DELETE, and PATCH.

In order to elucidate further, consider an example of a Representational State Transfer (REST) service in the networked environment. It is to be noted that the REST service is an architectural style for networked hypermedia applications. The REST service is primarily used to build Web services that are lightweight, maintainable, and scalable. Further, the microservice based on the REST service is called a RESTful service. Below are examples of the URL request made by the user device— https://myserver.com/resource-name?param1=<value1>&param2=<value2> https://myserver.com/resource-name/<name>

The extraction module 218 extracts the request pattern as the HTTP operation with operations including, but not limited to, POST, GET, PUT, DELETE, and PATCH. The HTTP operation in turn helps to do CRUD. Typically, the POST is used for create, GET for read, PUT/PATCH for update and DELETE for delete. In one embodiment, the URL may also be in an encoded form and the extraction module 218 may process the encoded URL accordingly. It must be noted that the request pattern may be stored at the system database 232.

In another embodiment, the request patterns may be extracted based on a path, a query, a form, and a header format of the request. In an exemplary embodiment, the HTTP headers may be "application/x-www-form-urlencoded" and "application/json". Table 1 and Table 2 indicates the request pattern extracted from the request made by the user device.

Table 1 indicates an example of an URL with POST method and with the set of input parameters from query and body. The roles and user credentials are passed for the URL and HTTP header to accept j son is mentioned. Below response shows status whether the user is created or not.

TABLE 1

| Description | Create User |
|---|---|
| URL | http://{hostname}:{port}/{microservice}/json/users |
| HTTP Method | POST |
| Path Parameter | N/A |
| Query Parameter | ownerId, roles |
| Form/Body Parameter | Userbean |
| Header Parameter | N/A |
| HTTP Headers | Accept: application/json |
| Request | http://localhost:82/admin-api/json/users |
| HTTP Response | Status whether user created or no |

Table 2 indicates another example of same URL but differentiated with GET method and recognized accordingly. The URL is same but the functionality of fetching the user list is different based on the HTTP method. The response shows the user contact, preference details and other details.

TABLE 2

| Description | Fetch the list of users |
|---|---|
| URL | http://{hostname}:{port}/{microservice}/json/users |
| HTTP Method | GET |
| Path Parameter | N/A |
| Query Parameter | N/A |
| HTTP Headers | Accept: application/json |
| Request | http://localhost:82/admin-api/json/users |
| HTTP Response | Json Response with User details like contact, preference, entity extension value (if any) |

After extracting the request pattern, the tracking module 220 tracks an Internet Protocol (IP) address associated to the URL in order to form a group of one or more IP addresses corresponding to the microservice. The IP address may be a subset of input parameters. In one embodiment, class A, B, C of the IP address ranges may be tracked. The tracking module 220 may also track details of public and private IP address. Typical example of the group of IP address belongs to below ranges—

10.0.0.0—10.255.255.255
172.16.0.0—172.31.255.255
192.168.0.0—192.168.255.255

In one embodiment, the tracking module 220 may track multiple requests made by the same IP address. Once the IP address is tracked, the system 102 may allow the access to the microservice. In another embodiment, the tracking module 220 may track each IP address belonging to a specific group of IP addresses. When an IP address is tracked from the specific group, the system 102 may allow the access to the microservice. In yet another embodiment, the tracking module 220 may track historical operation performed by the user device at the microservice. In an exemplary embodiment, the tracking module 220 may return a count of operations performed by the user device at one IP address. It must be noted that the tracked IP address may be stored at the system database 232.

In the next step, the detection module 222 detects user credentials from the request to allow an access to the microservice when requested by the user device. The user credentials comprise a user profile, roles and privilege. The user profile may include demographic information and historical information regarding interaction of the user and the networked environment. The roles may include a manager, an admin, a supervisor, an approver, and an initiator. The privilege manages level of abstraction to be incorporated while providing access to the microservice to the user. For example, to a request made from the admin having all require privileges, the detection module 222 would allow the access without any abstraction. It must be noted that the user credentials may be stored at the system database 232.

Subsequently, the generation module 224 generates a decision tree by using a supervised machine learning technique on the list of valid input parameters, the request pattern, the group of one or more IP address, and the user credentials. The decision tree may comprise rules to allow the access to the microservice. In one embodiment, the rules may be predefined rules stored at the system database 232. It must be noted that the decision tree may be stored at the system database 232. Example of the supervised machine learning technique includes support vector machines, linear regression, logistic regression, naive Bayes, linear discriminant analysis, decision trees, k-nearest neighbor algorithm, neural networks (multilayer perceptron), and similarity learning. It is to be noted that the generation module 224 may predict the rules by using the supervised machine learning technique on outputs of at least the validation module 216, the extraction module 218, the tracking module 220, and the detection module 222. The rules may be stored at the system database 232.

In order to explain further, example of rules in the decision tree is explained in below illustration.

```
If an URL is accessed [e.g.
    "http://localhost:9090/security-web/json/user"]
Then
    If Method is POST, Then process "user creation"
        If Anonymous Request Then "Disallow"
        Else If Authorized Request Then "Allow"
            If Parameters satisfied, Then "allow user creation"
            Else "error code"
            End If
        End If
    Else If Method GET, process "fetch user"
        If Anonymous Request, Then "Disallow"
        Else If Authorized Request Then "Allow"
            If Parameters satisfied, allow fetching user details
            Else "error code"
            End If
        End If
    End If
Else
    "Error code"
End If
```

In one embodiment, the generation module 224 may identify the rules from a predefined repository comprising rules for each branch of the decision tree. In one example, the predefined repository may be the system database 232. In another embodiment, the generation module 216 may create the rules based on the list of valid input parameters, the request pattern, the group of one or more IP address, and the user credentials.

Upon generating the decision tree, the creation module 226 creates a stateless identity token at the API to encrypt the request. The stateless identity token may be created based on the user credentials and at least one rule applicable to the request. The stateless identity token may act as a cookie for a web browser. It is to be noted that for each new session, the creation module 226 may create a separate stateless identity token. It is to be noted that the stateless identity token may be stored in the user device. In one aspect, the stateless identity token may also be stored at the system database 232. It is to be noted that current session of the user may not be required when the stateless identity token is implemented. The reusability of the stateless identity token helps to access multiple application and platforms based on the permission of user credentials in the stateless identity token. The stateless identity token deals with validation of json alone and server side look up for the session is not required.

Once the stateless identity token is created, the verification module 228 verifies the stateless identity token to allow a secure access to the microservice. In one embodiment, the verification module 228 may also verify whether the microservice is active or not. In one aspect, the verification module 228 may not allow access to the microservice when the microservice is inactive or unavailable. In other aspect, the verification module 228 may allow access to the microservice when the microservice is active or available.

Upon allowing the access, the system 102 may record user interaction with the microservice. The user interaction may be stored in the system database 232 to train the system 102. It is to be noted that the system 102 may be installed in a User Acceptance Testing (UAT) environment to train on the historical data stored at the system database 232.

Figure 3:
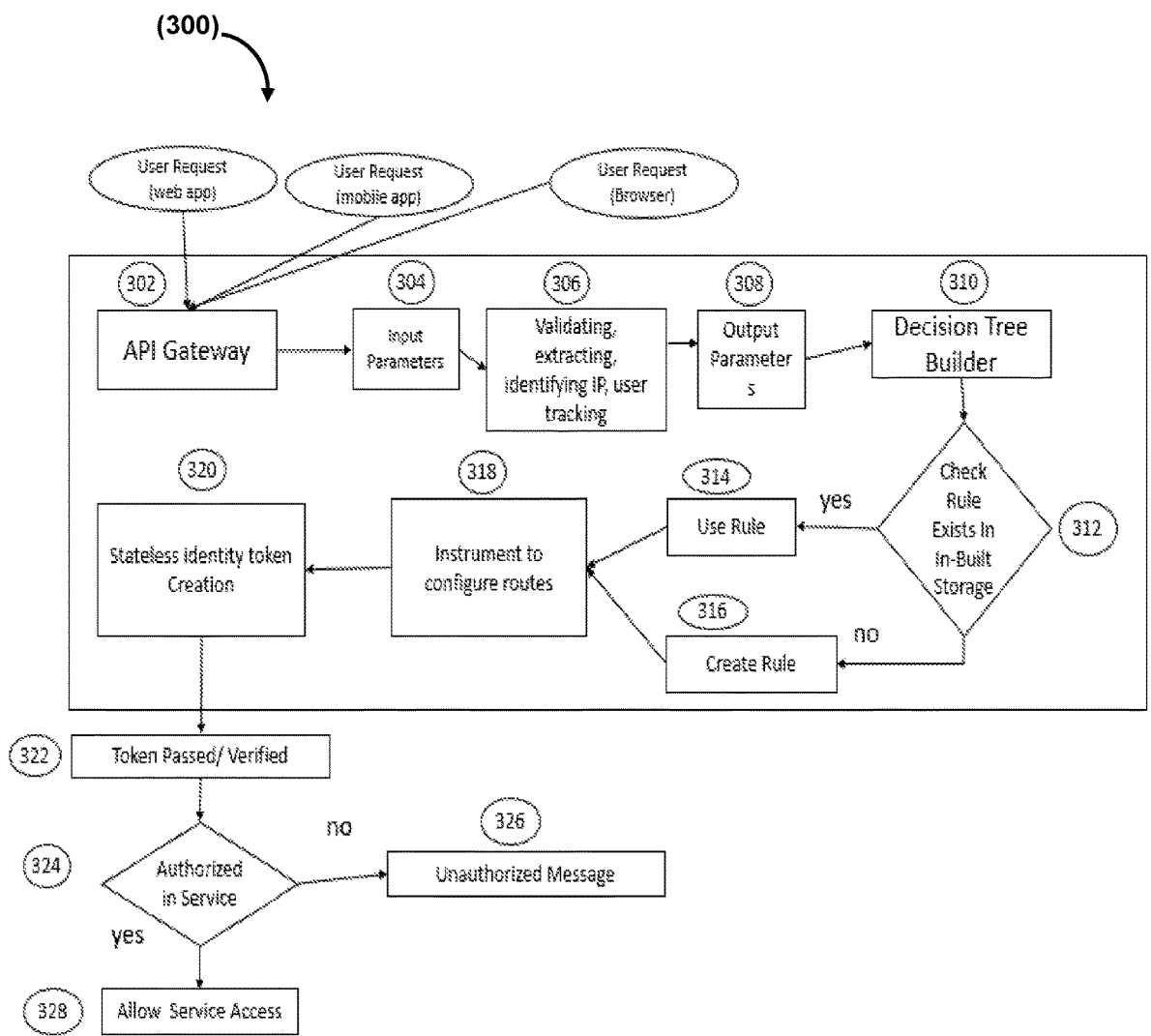
FIG. 3 illustrates a flowchart of the system, in accordance with an embodiment of the present subject matter.

Now referring to FIG. 3, a flowchart 300 for allowing a secure access to a microservice is shown, in accordance with an embodiment of the present subject matter. At block 302, the API gateway receives a request to allow access to the microservice. The request comprising a URL is received from at least a web application, mobile application, and a browser. At block 304, the system 102 identifies the set of input parameters from the URL. Further, at block 306, the system 102 performs multiple operations including, validation, extraction, identification, and tracking of IP to generate a set of output parameters. It is to be noted that each out parameter from the set of out parameters is corresponding to each operation performed by the system 102. Furthermore, at block 310, a decision tree builder generates a decision tree by using a supervised machine learning technique on the set of output parameters. It is to be noted that each branch of the decision tree comprises rules to access the microservice.

At block 312, the system 102 may check whether a list of predefined rules is stored in the system database 232. In one aspect, at block 314, the system 102 may use a rule from the list of predefined rules to allow access of the microservice. In another aspect, at block 316, the system 102 may create rules based on the set of output parameters. Subsequently, at block 318, the API gateway may configure routes to allow the access to the request based on user credentials and at least one rule either from the block 314 or the block 316. The rules consist of details in instrumenting to configure routes. The processing or execution of each rule performed in the block 318. It is to be noted that configuration of the routes helps to utilize the resources and identify the condition for a stateless identity token creation for the request.

At block 320, the system 102 generates the stateless identity token for the request based on the user credentials and the at least one rule applicable to the request. At block 322, the stateless identity token is verified by the system 102. At block 324, the system 102 ensures whether the user credentials are authorized to access the microservice. If the user credentials are not authorized, at block 326, a message indicating unauthorized access would be displayed on the user device. If the user credentials are authorized, at block 328, the system 102 allows the secure access of the microservice to the user device.

Figure 4:
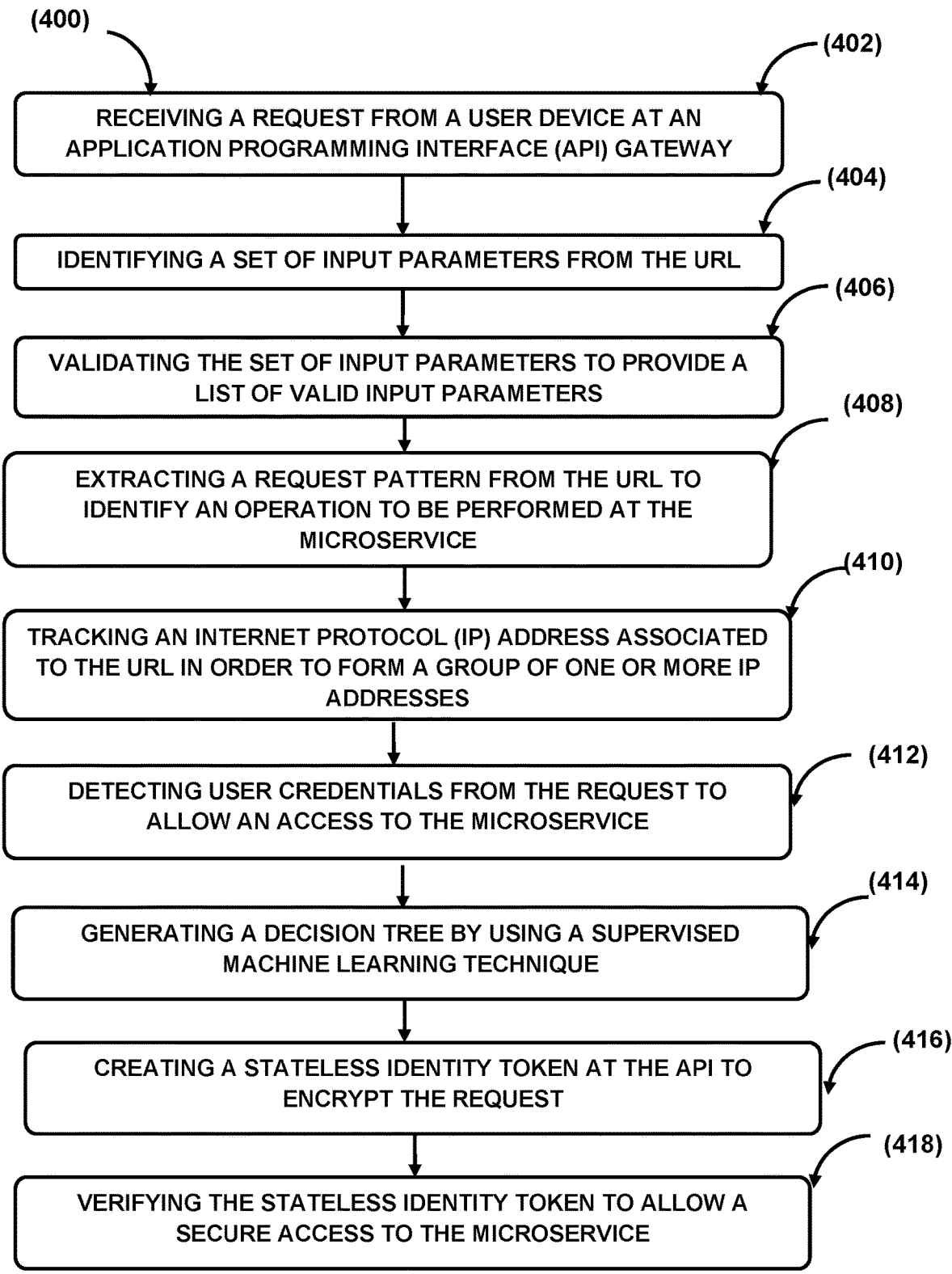
FIG. 4 illustrates a method for allowing a secure access to a microservice, in accordance with an embodiment of the present subject matter.

Referring now to FIG. 4, a method 400 for allowing a secure access to a microservice is shown, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 for allowing a secure access to a microservice is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented as described in the system 102.

At block 402, a request may be received from a user device at an Application Programming Interface (API) gateway. In one aspect, the request may comprise a Uniform Resource Locator (URL) associated to a microservice. In one implementation, the request from the user device may be received from a receiving module 212 and stored at a system database 232.

At block 404, a set of input parameters may be identified from the URL. In one aspect, the set of input parameters indicates information about the user device and the microservice. In one implementation, the set of input parameters may be identified by an identification module 214 and stored at the system database 232.

At block 406, the set of input parameters may be validated to provide a list of valid input parameters. In one aspect, the set of input parameters may be validated to provide a list of valid input parameters by comparing data type of each input parameter with a predefined list of valid data type for each input parameter. In one implementation, the set of input parameters may be validated by a validation module 216 and stored at the system database 232.

At block 408, a request pattern may be extracted from the URL to identify an operation to be performed at the microservice. In one aspect, the request pattern is extracted by using machine learning techniques on historical data associated to the request pattern. In one implementation, the request pattern may be extracted by an extraction module 218 and stored at the system database 232.

At block 410, an Internet Protocol (IP) address associated to the URL may be tracked in order to form a group of one or more IP addresses corresponding to the microservice. In one aspect, the IP address is a subset of input parameters. In one implementation, the IP address associated to the URL may be tracked by a tracker module 220 and stored at the system database 232.

At block 412, user credentials may be detected from the request to allow an access to the microservice when requested by the user device. In one implementation, the user credentials may be detected from the request by a detection module 222 and stored at the system database 232.

At block 414, a decision tree may be generated by using a supervised machine learning technique on the list of valid input parameters, the request pattern, the group of one or more IP address, and the user credentials. In one aspect, the decision tree comprises rules to allow the access to the microservice. In one implementation, the decision tree may be generated by a generation module 224 and stored at the system database 232.

At block 416, a stateless identity token may be created at the API to encrypt the request. In one aspect, the stateless identity token is created based on the user credentials and at least one rule applicable to the request. In one implementation, a stateless identity token may be created by a creation module 226 and stored at the system database 232.

At block 418, the stateless identity token may be verified to allow a secure access to the microservice. In one implementation, the stateless identity token may be verified by a verification module 228 and stored at the system database 232.

Exemplary embodiments discussed above may provide certain advantages. Though not required to practice aspects of the disclosure, these advantages may include those provided by the following features.

Some embodiments enable a system and a method to facilitate secure access to the microservice using a user device.

Some embodiments enable a system and a method to prevent unauthorized access to the microservice based on user credentials.

Some embodiments enable a system and a method to create a stateless identity token at the API gateway to allow secure access of the microservice.

Some embodiments enable a system and a method to allow a secure access to the microservice with minimal configuration overhead.

Some embodiments enable a system and a method to allow a secure access to the microservice in real time based on the set of input parameters.

Although implementations for methods and systems for allowing a secure access to a microservice have been described in language specific to structural features and/or methods, it is to be understood that the appended claims are not necessarily limited to the specific features or methods described. Rather, the specific features and methods are disclosed as examples of implementations for allowing the secure access to the microservice.

The invention claimed is:

1. A method for allowing a secure access to a microservice, the method comprising:
   receiving, by a processor, a request from a user device at an Application Programming Interface (API) gateway, wherein the request comprises a Uniform Resource Locator (URL) associated to a microservice;
   identifying, by the processor, a set of input parameters from the URL, wherein the set of input parameters indicates information about the user device and the microservice;
   validating, by the processor, the set of input parameters to provide a list of valid input parameters by comparing data type of each input parameter with a predefined list of valid data type for each input parameter;
   extracting, by the processor, a request pattern from the URL to identify an operation to be performed at the microservice, wherein the request pattern is extracted by using machine learning techniques on historical data associated to the request pattern;
   tracking, by the processor, an Internet Protocol (IP) address associated to the URL in order to form a group of one or more IP addresses corresponding to the microservice, wherein the IP address is a subset of input parameters;
   detecting, by the processor, user credentials from the request to allow an access to the microservice when requested by the user device;
   generating, by a processor, a decision tree by using a supervised machine learning technique on the list of valid input parameters, the request pattern, the group of one or more IP address, and the user credentials, wherein the decision tree comprises rules to allow the access to the microservice;
   creating, by the processor, a stateless identity token at the API to encrypt the request, wherein the stateless identity token is created based on the user credentials and at least one rule applicable to the request; and
   verifying, by the processor, the stateless identity token to allow a secure access to the microservice.

2. The method of claim 1 further comprises:
   identifying the rules from a predefined repository comprising rules for each branch of the decision tree; and
   creating the rules based on the list of valid input parameters, the request pattern, the group of one or more IP address, and the user credentials, wherein the rules are created for each branch when the predefined repository is out of rules.

3. The method of claim 1, wherein the set of input parameters are a user name, user roles and permission, a location of the user device, an age of the request, a frequency of requests, a time gap between two requests, a count of requests made by the user device in a session, an access location pattern, and a location change pattern.

4. The method of claim 1, wherein the API gateway acts as a single point of entry for a group of microservices.

5. A system for allowing a secure access to a microservice, the system comprises:
   a processor;
   a memory coupled to the processor, wherein the processor executes a set of instructions stored in the memory to:
   receive a request from a user device at an Application Programming Interface (API) gateway, wherein the request comprises a Uniform Resource Locator (URL) associated to a microservice;
   identify a set of input parameters from the URL, wherein the set of input parameters indicates information about the user device and the microservice;
   validate the set of input parameters to provide a list of valid input parameters by comparing data type of each input parameter with a predefined list of valid data type for each input parameter;
   extract a request pattern from the URL to identify an operation to be performed at the microservice, wherein the request pattern is extracted by using machine learning techniques on historical data associated to the request pattern;
   track an Internet Protocol (IP) address associated to the URL in order to form a group of one or more IP addresses corresponding to the microservice, wherein the IP address is a subset of input parameters;
   detect user credentials from the request to allow an access to the microservice when requested by the user device;
   generate a decision tree by using a supervised machine learning technique on the list of valid input parameters, the request pattern, the group of one or more IP address, and the user credentials, wherein the decision tree comprises rules to allow the access to the microservice;
   create a stateless identity token at the API to encrypt the request, wherein the stateless identity token is created based on the user credentials and at least one rule applicable to the request; and verify the stateless identity token to allow a secure access to the microservice.

6. The system of claim 5 further comprises:
identifying the rules from a predefined repository comprising rules for each branch of the decision tree; and
creating the rules based on the list of valid input parameters, the request pattern, the group of one or more IP address, and the user credentials, wherein the rules are created for each branch when the predefined repository is out of rules.

7. The system of claim 5, wherein the set of input parameters are a user name, user roles and permission, a location of the user device, an age of the request, a frequency of requests, a time gap between two requests, a count of requests made by the user device in a session, an access location pattern, and a location change pattern.

8. The system of claim 5, wherein the API gateway acts as a single point of entry for a group of microservices.

9. A non-transitory computer readable medium embodying a program executable in a computing device for allowing a secure access to a microservice, the program comprising:
a program code for receiving a request from a user device at an Application Programming Interface (API) gateway, wherein the request comprises a Uniform Resource Locator (URL) associated to a microservice;
a program code for identifying a set of input parameters from the URL, wherein the set of input parameters indicates information about the user device and the microservice;
a program code for validating the set of input parameters to provide a list of valid input parameters by comparing data type of each input parameter with a predefined list of valid data type for each input parameter;
a program code for extracting a request pattern from the URL to identify an operation to be performed at the microservice, wherein the request pattern is extracted by using machine learning techniques on historical data associated to the request pattern;
a program code for tracking an Internet Protocol (IP) address associated to the URL in order to form a group of one or more IP addresses corresponding to the microservice, wherein the IP address is a subset of input parameters;
a program code for detecting user credentials from the request to allow an access to the microservice when requested by the user device;
a program code for generating a decision tree by using a supervised machine learning technique on the list of valid input parameters, the request pattern, the group of one or more IP address, and the user credentials, wherein the decision tree comprises rules to allow the access to the microservice;
a program code for creating a stateless identity token at the API to encrypt the request, wherein the stateless identity token is created based on the user credentials and at least one rule applicable to the request; and
a program code for verifying the stateless identity token to allow a secure access to the microservice.

10. The program of claim 9 further comprises:
a program code for identifying the rules from a predefined repository comprising rules for each branch of the decision tree; and
creating the rules based on the list of valid input parameters, the request pattern, the group of one or more IP address, and the user credentials, wherein the rules are created for each branch when the predefined repository is out of rules.

* * * * *